United States Patent [19]

Frederick et al.

[11] 4,246,922

[45] Jan. 27, 1981

[54] FLUID FLOW CONTROL APPARATUS

[75] Inventors: Gary L. Frederick, Tempe; Paul R. Mohr, Phoenix, both of Ariz.

[73] Assignee: The Garrett Corporation, Los Angeles, Calif.

[21] Appl. No.: 813,605

[22] Filed: Jul. 7, 1977

[51] Int. Cl.² ............................................. G05D 11/03
[52] U.S. Cl. ................................ 137/110; 137/599.1; 137/895; 417/186
[58] Field of Search ...................... 137/110, 599.1, 604; 417/179, 180, 186, 189

[56] References Cited

U.S. PATENT DOCUMENTS

| 2,873,758 | 2/1959 | Nielsen | 137/599.1 X |
|---|---|---|---|
| 3,188,055 | 6/1965 | Lutjens et al. | 137/599.1 UX |
| 3,257,180 | 6/1966 | King | 137/599.1 UX |
| 3,463,151 | 8/1969 | Neff | 417/186 X |
| 3,739,794 | 6/1973 | Lindgren | 137/599.1 X |

FOREIGN PATENT DOCUMENTS 245968   10/1969   U.S.S.R. .................................. 417/189

*Primary Examiner*—Robert G. Nilson
*Attorney, Agent, or Firm*—James W. McFarland; Albert J. Miller

[57] ABSTRACT

A plurality of aspirating ejector nozzles are fed with primary fluid which is admitted successively past a modulating valve and throttling orifice to the inlet ports of the nozzles with a portion of the primary fluid being arranged for bypassing the nozzle past a bypass valve controlled by pressure responsive means subject to the pressure of the primary fluid upstream of the throttling orifice.

33 Claims, 4 Drawing Figures

FLUID FLOW CONTROL APPARATUS

BACKGROUND OF THE INVENTION (1) Field of the Invention

This invention pertains generally to fluid flow apparatus for aspirating and mixing two fluids, and is more particularly directed to apparatus of the type for obtaining a desired condition of the fluid mix with varying mix condition requirements, or varying conditions of the primary and secondary component fluids, or either of them. Still more particularly, the invention is directed to apparatus for supplying the ventilating air for an aircraft from a hot bleed source (the engine of the aircraft) and a cold air source with the cold air aspirated by the hot pressurized air, in the novel apparatus of the invention, and wherein the temperatures of the source airs may vary and the temperature selection of the ventilating air may vary.

(2) Description of the Prior Art

An approach to solutions for the problems associated with flow controls of the type is exemplified in U.S. Pat. No. 3,394,884 on an invention by T. J. Lord of a "System of Mixed Air Flows".

In that patent there is disclosed a spring biased sleeve valve which controls the relative amounts of primary and secondary air, supplied by a primary hot air pressurized source and secondary ambient air, respectively, that are admitted into a mixing duct for transport to the point of use.

The design of the patented valve of Lord is subject to several limitations and undesirable features: (1) the Lord valve uses a variable ejector to provide control of the ratio between primary and secondary airs; (2) the variable, single port ejector primary nozzle requires a relatively long downstream mixing duct for ambient air induction, characteristically a duct length of the order of about 50 times the effective valve diameter; (3) the Lord valve modulates ambient secondary air flow as well as primary bleed flow; (4) for a fixed bleed pressure, the patented device is a highly varying total mixed flow as the sleeve valve strokes, unless both the primary area vs. stroke and ambient secondary area vs. stroke characteristics are controlled; (5) for a given valve position, the Lord device will give different total flows as (primary) bleed pressure varies; (6) for most operating conditions, the Lord device drops full bleed pressure down to ambient across the variable ejector, generating a very high level of noise which is transmitted into the downstream duct.

SUMMARY OF THE INVENTION

The apparatus according to the present invention overcomes the disadvantages and shortcomings of the prior art enumerated above, as follows: (1) a fixed ejector means is utilized, eliminating a possible source of trouble with the moving parts of a variable ejector at this critical point; (2) the fixed ejector means comprises multiple port ejectors which require considerably less duct length for mixing than is the case of a single ejector, and this design lends itself to smaller packaging which is an important consideration in aircraft systems; (3) only primary air is modulated; (4) a fairly constant total flow is provided; (5) bleed (primary fluid) flow and mixed flow remain essentially constant for wide variations in bleed air pressure; (6) bleed fluid pressure is dropped through a series of restrictions, most of which are isolated from the downstream ducting; also, the multiple port primary nozzle means generates lower transmitted noise levels than those of a single nozzle of equal size. It should be noted that the invention is not limited to compressible fluids, nor to incompressible fluids.

Accordingly, the invention has for its principle object the improvement of fluid flow apparatus of the aspirating nozzle type which overcomes the limitations, disadvantages, shortcomings and undesirable features of the prior art devices. To this end it is an important object of the invention to provide fluid flow apparatus which will effect the mixing of two fluids in a ratio, which may vary as the circumstances demand, to achieve a constant total flow rate which may be a constant mass flow rate or a constant volumetric flow rate of the fluid mix. A corollary to the last mentioned object is the further object to provide apparatus of the type to achieve the aforesaid constant flow rate as the temperature of the fluid mix varies.

The aforesaid objects are particularly important in the ventilation air heating needs for supplying the cabin of an aircraft where there is a requirement for a specified number of cubic feet of ventilation air per person per minute.

It is another object of the invention to provide apparatus which achieves high ratios of the induced secondary fluid flow to the inducing primary fluid flow with a minimum of primary pressure ratio, thereby resulting in efficient operation with a minimum of noise generated.

It is a general object of the invention to provide apparatus which is adapted for compatible use with one or more temperature selectors, temperature transducers, and temperature sensors used in a compartment control system of the type disclosed in an application for Letters Patent, Ser. No. 813,607, filed concurrently herewith, on a joint invention by B. Franklin Saylor, David H. Holmgren, and Robert A. Null, entitled "Fluid Flow Control Apparatus and System" and assigned to the same assignee as that of the present application. It will be understood by those skilled in the art that the invention of the present application is not limited to use in such a system as aforesaid, but is susceptible to a variety of uses, either alone or in systems which may be of the open or closed loop variety, thus providing a high degree of flexibility for designers.

Another important object of the invention is to provide apparatus employing fixed ejector geometry of the multi-port design, together with flow control means in a novel combination to achieve efficient operation in a minumum package. It is yet another object to provide apparatus of fixed ejector geometry with means for controlled fluid bypass to achieve constant total flow as the amount of primary fluid or the temperature of that fluid varies over a broad range.

It is still a further object of the invention to provide apparatus which is characterized by ease of fabrication of a minimum number of parts, and by simplicity of assembly whereby lower cost is achieved and the apparatus requires a minimum of maintenance for assured reliability. Other and further objects will be apparent at once to those skilled in the art upon consideration of the drawings when considered in connection with the description thereof hereinbelow.

DESCRIPTION OF THE PREFERRED EMBODIMENT

Figure 1:
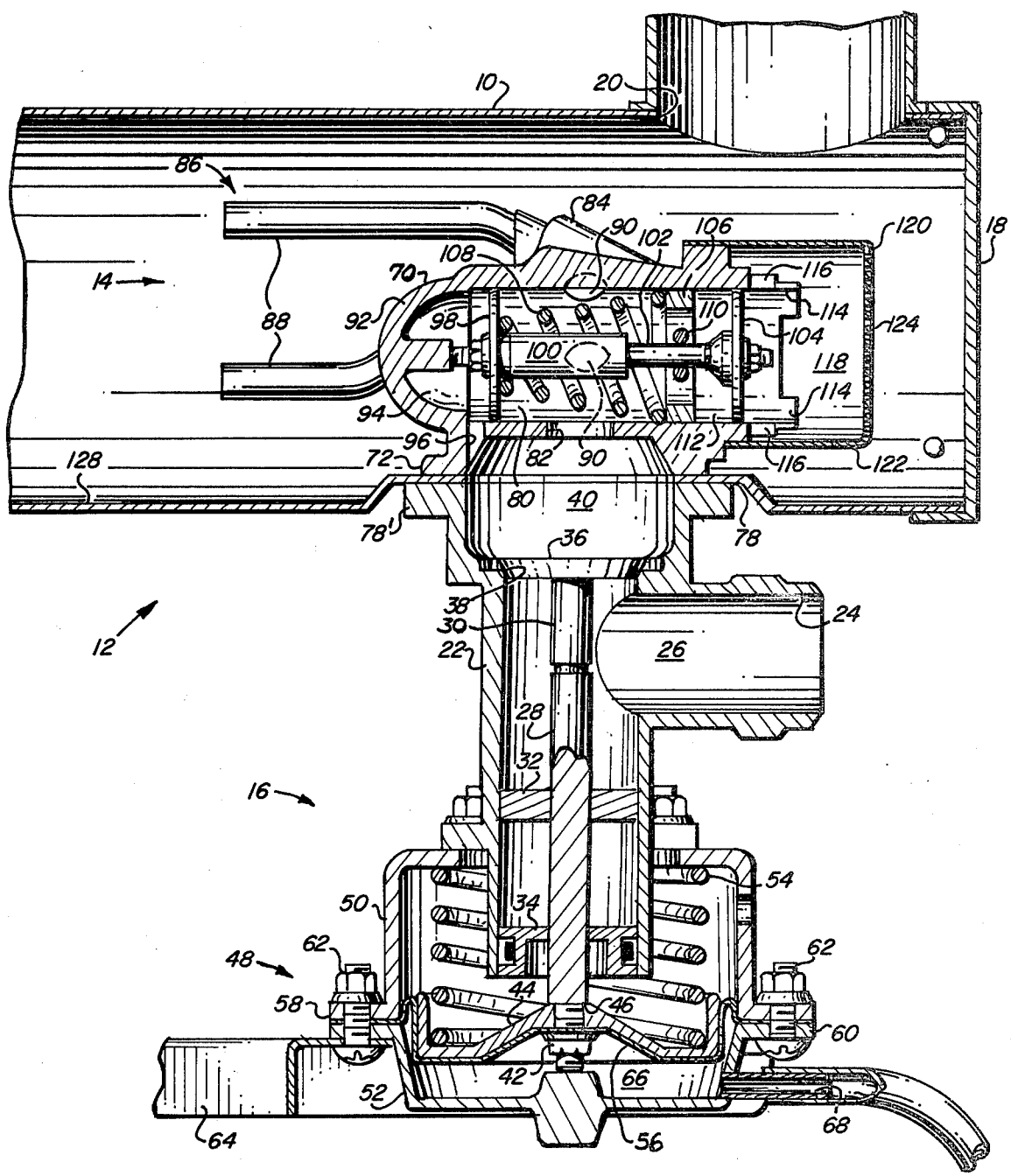
FIG. 1 is an illustration, in cross-section, of an embodiment of the invention.

Referring to FIG. 1 there is illustrated a fluid duct 10, to which is mounted the fluid flow apparatus 12 and which is comprised of an ejector assembly 14 and a primary fluid inlet assembly 16. One end of the duct 10 is closed by an end cap 18, and adjacent thereto is an inlet port 20 arranged for coupling to a secondary fluid source (not shown). The inlet assembly 16 comprises a housing 22 provided with an inlet port 24 arranged for coupling to a primary fluid source (not shown).

The interior of the housing 22 defines a passageway 26 within which is disposed the linearly movable valve assembly 28 having a valve stem 30 constrained for linear movement in the passageway 26 by the flanged members 32 and 34, both of which guide the assembly 28 in its linear movement to actuate a poppet valve 36, on the end of the stem 30, to and from a valve seat 38 formed on the housing 22 at one end of the passageway 26 which communicates with the inlet port 24. As will be seen, the valve 36 is adapted to shut off fluid flow from the inlet port 24 to the passageway space 40 in the upper end of the housing 22. Opening movement of the valve 36 permits modulated fluid flow from the passageway to the space 40.

A nut 42 threadably received on the said other end of the stem 30 secures a dished disc member 44 against a shoulder 46 on the stem 30. The disc 44 is disposed within a housing assembly 48 comprised of upper and lower housing elements 50 and 52 with a compression spring 54 disposed between the disc 44 and the upper housing element 50. Underlying the disk 44 is an elastomeric diaphragm 56 whose peripheral edge is disposed between the housing flanges 58 and 60 with bolts 62 arranged to secure the elements 50 and 52 together and secured to a mounting bracket, partially shown at 64. The diaphragm 56 and the housing element 52 define a chamber 66 communicating with a port 68 which is arranged for the application of fluid control pressure to the chamber 66 to actuate the valve 36 off its seat 38 and thereby modulate the primary fluid flow from the port 24 to the passageway space 40 as a function of the control fluid pressure applied to the port 68. Preferably, the effective areas of the flanged member 32 and the poppet valve 36 are substantially equal in order to balance the effect of the pressure of the primary fluid exerted on the underside of the valve 36.

Figure 2:
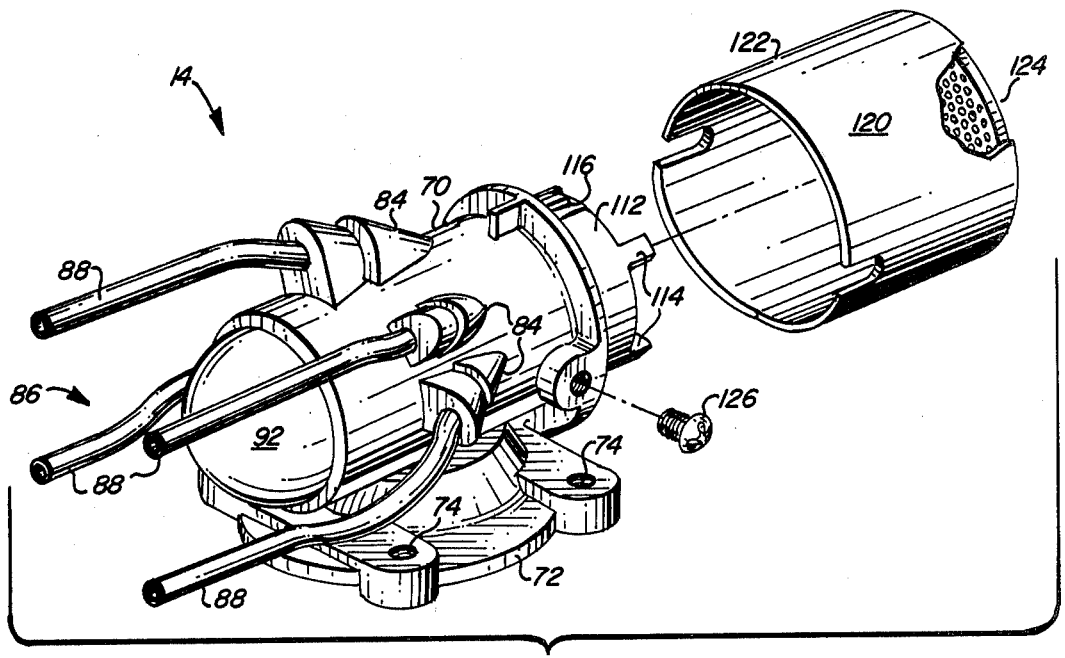
FIG. 2 is an axonometric projection of a partially exploded portion of the embodiment of FIG. 1.

The ejector assembly 14 comprises a housing 70 having a base portion 72 provided with threaded mounting holes 74 (FIGS. 2 and 3) arranged to receive bolts (not shown) passing through the holes (not shown) in the upper flanged portion 78' of the housing 22 and the dished portion 78 of the duct 10 and thereby secure the parts together.

Figure 4:
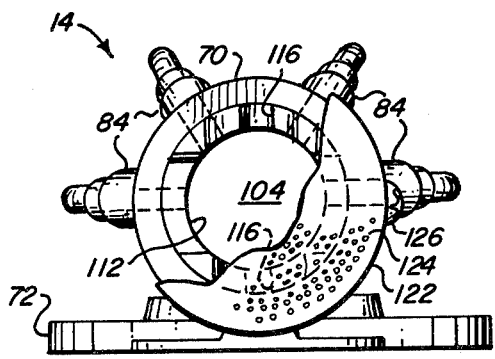
FIG. 4 is an end view, partially broken away, of the embodiment of FIG. 3.

The housing 70 defines a passageway 80 communicating through a throttling orifice 82 with the space 40 above the poppet valve 36. The housing 70 is also provided with angularly disposed bosses 84 (shown here on FIG. 4 as being four in number) from which project the nozzle means 86 comprised of the four ejector nozzles 88 which communicate through ports 90 (one of which is shown in whole and one phantom on FIG. 1) with the passageway 80. The housing 70 is provided with a rounded wall portion 92 which defines a chambered space 94 communicating with the space 40 through a passageway bore 96, whereby the pressure of the primary fluid in the space 40 is manifest on a piston 98 secured on a piston rod 100 forming an enlarged extension of the valve stem 102 secured to a slide valve 104.

A buttress ring 106 is secured to the interior of the housing 70 by any preferred means, as by screws. A compression spring 108 is disposed about the piston rod 100 between the back face of the piston 98 and the buttress ring 106 to urge the piston toward the chamber space 94 against the fluid pressure force therein. The ring 106 is provided with spaced-apart transversely-disposed stop pins 110 which straddle the valve stem 102 in order to be engaged by the end of the piston rod 100 at the limit of travel of the slide valve 104.

The ejector housing 70 extends to the right, as seen on FIG. 1, to form a barrel portion 112, the rightward end of which is formed with valve guide tangs 114 which guide and contain the slide valve 104 at its limit of movement. Formed in the barrel portion 112 are the fluid bypass slots 116, shown here as two in number and diametrically opposed. Surrounding the barrel portion 112, and defining therewith a chambered space 118, is a baffle cage 120 comprised of a cylindrical sheet metal element 122 with a perforated sheet metal baffle element 124 secured to the end thereof. The cage 120 is secured to the housing 70 by a pair of screws 126 threadably received in the housing 70.

As will be seen, as the valve 104 is modulated open by primary fluid pressure in the space 40, as manifested through the passageway bore 96 into the chambered space 94 and hence on the piston 98, bypass primary fluid flow from the passageway 80 is modulated through the slots 116 into the chambered space 118, and thence through the perforations in the baffle element 124 into the interior of the duct 10 adjacent the end cap 18 and the secondary fluid inlet 20 where it mixes with the incoming secondary fluid flow to be thereafter aspirated by the nozzle means 86 into the mixing section 128 of the duct 10 to be conducted therefrom to the point of use. It will be noted that the piston 98 and the valve 104 have substantially equal effective areas so that they are balanced to fluid pressure in the passageway 80. It will also be appreciated that the multi-ported arrangement of the nozzles 86 provides the very distinctive advantage of a greatly reduced length of the mixing section 128 as compared with the required length for a single ejector of the same flow capacity. In addition, the smaller ejector jets generate less noise, with the residual being of a higher frequency which is attenuated more easily.

In addition, the provision of the baffle arrangement for the bypassed primary fluid affords the opportunity to establish a small pressure drop across the perforated baffle element and thus add an attenuating feature for noise generated at the interface of the valve 104 and slots 116 by the modulated bypassed flow at those points. As will be evident, the baffle arrangement is feasible since the bypassed primary fluid flow is not being used to induce secondary fluid flow through the duct 10. Hence the nozzle means 86 aspirate the bypassed primary fluid as well as the secondary fluid from the port 20.

OPERATION OF THE INVENTION

In a typical embodiment of the invention, the above described fluid flow apparatus was utilized in the ventilation system for an aircraft wherein the primary fluid flow was bleed flow from the compressor section of the engine at a nominal temperature of about 308° F. The apparatus had a useful range of 30–110 psig (pounds per square inch gauge) for the pressure of the primary bleed fluid upstream of the throttling orifice 82, and the secondary source was ambient air which would vary in pressure from altitudes of sea level up to about 15,000 feet, and which would vary in temperature from about 40° F. down to about −22° F. It will be understood, of course, that these pressures and temperatures are not to be taken as limitations on the invention.

Figure 3:
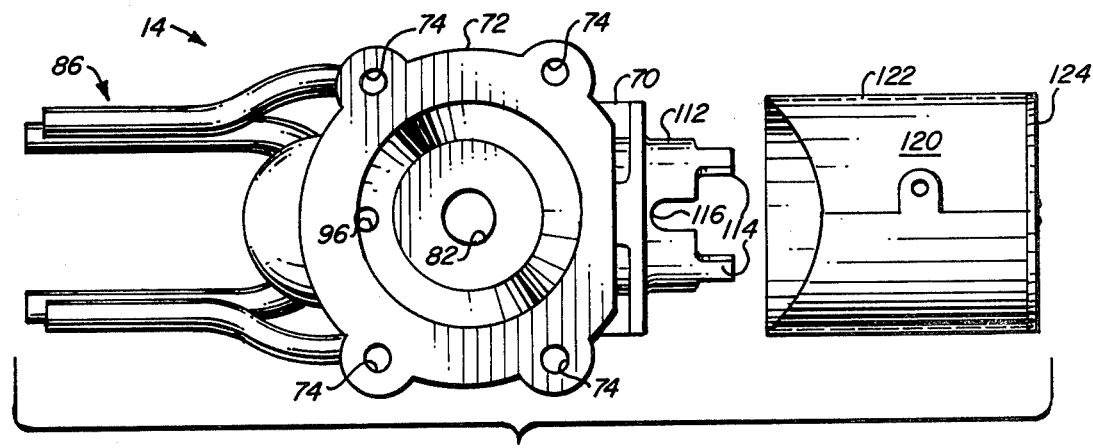
FIG. 3 is a view, looking toward the bottom face of the embodiment of FIG. 2.

The apparatus was coupled in the system according to FIG. 3 of the aforementioned patent application, Ser. No. 813,607 where the pressure at the port 68 of the apparatus here was proportional to the desired cabin temperature of the aircraft. The apparatus functioned to provide constant flow as the amount of hot bleed air decreased or the temperature of the air dropped. This was done by inducing secondary outside air in mixing with the bypassed primary air to give a total constant flow. This occurred by reason of the combination of the throttling orifice (which thus established a modulating pressure differential across the piston 98) together with the bypass valve 104 (which acted as a regulator). As can now be seen, the orifice in this combination really produced the constant flow.

The total mass flow through the throttling orifice was regulated by the modulating poppet valve 36 which was positioned, as noted, as a function of the desired cabin temperature. Under most conditions, the throttling orifice was choked so that what was had was essentially a mass primary bleed flow proportional to the head pressure on the orifice, hence proportional to the required cabin temperature. The throttling orifice 82 was sized such that the flow through the nozzle means 86 was relatively constant. The throttling means became choked at an upstream pressure in the space 40 of about 30 psig.

The term "choked" as used above (and as is well known to those skilled in the art), applies to that condition of fluid flow through an orifice wherein the rate of flow has increased, by reason of upstream pressure, to such a level that changes of pressure on the downstream side of the orifice no longer have any substantial effect on the flow rate, on the condition that pressure differential across the orifice does not decrease to a value whereat the choked condition of the orifice is no longer maintained.

We claim:

1. Fluid flow control apparatus providing a flow path for fluid from a pressurized source thereof to a space of lower pressure, comprising:
   (a) wall means defining a fluid flow passageway in the flow path and having inlet means arranged to admit pressurized fluid thereinto;
   (b) nozzle means having fluid inlet means coupled to and communicating with said fluid flow passageway, and having fluid outlet means for discharging fluid from said fluid flow passageway to the space of lower pressure;
   (c) fluid flow modulating control means, including control valve means disposed in said fluid flow passageway downstream from said inlet means thereof and valve actuating means coupled to said control valve means, and further including fluid throttling orifice means disposed in said fluid flow passageway downstream of said control valve means, for controlling the fluid flow therethrough;
   (d) wall means defining a fluid bypass passageway having an inlet end thereof coupled to and communicating with said fluid flow passageway intermediate said fluid flow modulating control means and said inlet means of said nozzle means, and having an outlet end thereof discharging to the space of lower pressure; and
   (e) bypass fluid flow modulating control means including bypass valve means disposed in said fluid bypass passageway to modulate the fluid bypass flow therethrough, and further including actuating means coupled to said fluid bypass valve means, said actuating means having fluid pressure sensitive means subject to fluid pressure in said fluid flow passageway for modulating the fluid flow through said fluid bypass passageway, whereby a substantially constant fluid flow to the space of lower pressure is maintained.

2. The apparatus of claim 1 in which said nozzle means comprises a plurality of ejector nozzles.

3. The apparatus of claim 1 in which said valve actuating means includes control fluid pressure responsive means subject to modulating control fluid pressure to modulate the fluid flow applied to said fluid throttling orifice.

4. The apparatus of claim 3 in which said modulating control fluid pressure is a function of a condition of the fluid in said space of lower pressure.

5. The apparatus of claim 1 in which the pressure to which said fluid pressure sensitive means is subject is the fluid pressure in said fluid flow passageway intermediate said fluid throttling orifice means and said nozzle fluid inlet means.

6. The apparatus of claim 1 in which the pressure to which said fluid pressure sensitive means is subject is the fluid pressure differential across said bypass valve means.

7. Fluid flow control apparatus providing a flow path for fluid from a pressurized source thereof to a space of lower pressure, comprising:
   (a) wall means defining a fluid flow passageway in the flow path and having means arranged to admit pressurized fluid thereinto;
   (b) fluid throttling orifice means disposed in said fluid flow passageway for controlling the fluid flow therethrough;
   (c) nozzle means disposed in said fluid flow passageway downstream from said fluid throttling orifice means and having fluid inlet means coupled to and communicating with said fluid flow passageway and having fluid outlet means for discharging fluid from said fluid flow passageway to the space of lower pressure;
   (d) wall means defining a fluid flow bypass passageway having an inlet end thereof coupled to and communicating with said fluid flow passageway and having an outlet end thereof discharging to the space of lower pressure; and
   (e) bypass fluid flow modulating control means including bypass valve means disposed in said fluid bypass passageway, and further including actuating means coupled to said bypass valve means, said actuating means having fluid pressure sensitive means subject to the fluid pressure differential across said fluid throttling orifice means for modulating the fluid flow through said fluid bypass passageway, whereby a substantially constant fluid flow to the space of lower pressure is maintained.

8. The apparatus of claim 7 in which said fluid pressure sensitive means is subject further to the fluid pressure differential across said bypass valve means.

9. The apparatus of claim 7 in which said nozzle means comprises a plurality of ejector nozzles.

10. Fluid flow control apparatus providing a flow path for fluid from a pressurized source to a compartment, comprising:
 (a) duct means having an interior communicating with fluid inflow port means arranged for the admission thereat of a first fluid into said duct means interior, an outlet of said duct means being arranged for fluid discharge into the compartment;
 (b) housing means having first wall means defining a fluid flow passageway in the flow path and having fluid inflow port means arranged for the admission thereat of a second pressurized fluid thereinto;
 (c) fluid flow modulating control means, including fluid throttling orifice means disposed in said fluid flow passageway for controlling the fluid flow therethrough;
 (d) aspirating nozzle means having fluid inlet means coupled to and communicating with said fluid flow passageway;
 (e) means mounting said housing means on said duct means with the fluid outlet means of said nozzle means communicating with said duct means interior;
 (f) second wall means of said housing means defining a fluid bypass passageway having an inlet end thereof coupled to and communicating with said fluid flow passageway and the outlet end coupled to said duct means to provide for bypass fluid discharge into said duct means interior; and
 (g) bypass fluid flow modulating control means including bypass valve means disposed in said fluid bypass passageway to modulate the fluid bypass flow therethrough, and further including actuating means coupled to said bypass valve means, said actuating means having fluid pressure sensitive means subject to fluid pressure in said fluid flow passageway for modulating the flow of said second fluid through said fluid bypass passageway, whereby a substantially constant fluid flow to the compartment is maintained.

11. The apparatus of claim 10 in which said fluid flow modulating control means comprises:
 (a) control valve means disposed in said fluid flow passageway upstream of said fluid throttling orifice means; and
 (b) valve actuating means coupled to said control valve means to modulate the fluid flow applied to said fluid throttling orifice means.

12. The apparatus of claim 10 in which said fluid flow modulating control means comprises:
 (a) control valve means disposed in said fluid flow passageway upstream of said fluid throttling orifice means; and
 (b) valve actuating means coupled to said control valve means and having control fluid pressure responsive means subject to modulating control fluid pressure to modulate the fluid flow applied to said fluid throttling orifice means.

13. The apparatus of claim 10 in which said fluid flow modulating control means comprises:
 (a) control valve means disposed in said fluid flow passageway upstream of said fluid throttling means; and
 (b) valve actuating means coupled to said control valve means and having control fluid pressure responsive means subject to modulating control fluid pressure which is a function of a condition of the fluid in said compartment, to modulate the fluid flow to said fluid throttling orifice means.

14. The apparatus of claim 10 in which the pressure to which said fluid pressure sensitive means is subject is the fluid pressure in said fluid flow passageway intermediate said fluid throttling orifice means and said nozzle fluid inlet means.

15. The apparatus of claim 10 in which the pressure to which said fluid pressure sensitive means is subject is the fluid pressure differential across said fluid throttling orifice means.

16. The apparatus of claim 10 in which the pressure to which said fluid pressure sensitive means is subject is the fluid pressure differential across said bypass valve means.

17. The apparatus of claim 10 in which the pressure to which said fluid pressure sensitive means is subject is the fluid pressure differential across said fluid throttling orifice means and is subject further to the fluid pressure differential acorss said bypass valve means.

18. The apparatus of claim 10 in which the pressure to which said fluid pressure sensitive means is subject is the fluid pressure upstream of said fluid throttling orifice means and is subject further to the fluid pressure downstream from said bypass valve means.

19. The apparatus of claim 10 in which the said fluid pressure sensitive means comprises first and second fluid pressure sensitive elements coupled together to act jointly on said fluid bypass valve means, one face of each of said elements being subject to said fluid pressure in said fluid flow passageway intermediate said fluid throttling orifice means and said bypass valve means, the other face of one of said elements being subject to the fluid pressure upstream from said fluid throttling orifice means, the other face of the other of said elements being subject to the fluid pressure downstream from said bypass valve means.

20. The apparatus of claim 10 in which said nozzle means comprises a plurality of ejector nozzles.

21. Fluid flow control apparatus providing a flow path for fluid from a pressurized source thereof to a space of lower pressure, comprising:
 (a) wall means defining a fluid flow passageway in the flow path;
 (b) fluid flow modulating control means, including fluid throttling orifice means, disposed in said fluid flow passageway for controlling the fluid flow therethrough from said pressurized source;
 (c) nozzle means disposed in said fluid flow passageway and having fluid inlet means coupled to and communicating with said fluid flow passageway downstream from said fluid flow modulating control means, and having fluid outlet means for discharging fluid from said fluid flow passageway to the space of lower pressure;
 (d) wall means defining a fluid bypass passageway having an inlet end thereof coupled to said fluid flow passageway intermediate said fluid flow modulating control means and said nozzle means, and having an outlet end thereof discharging to the space of lower pressure; and (e) bypass fluid flow modulating control means including bypass valve means disposed in said fluid bypass passageway to modulate the fluid bypass flow therethrough, and further including actuating means coupled to said bypass valve means, said actuating means having pressure sensitive means subject to fluid pressure in said fluid flow passageway intermediate said fluid flow modulating control means and said fluid bypass passageway, and further subject to the fluid pressure upstream of said fluid throttling orifice means.

22. The apparatus of claim 21 in which said fluid pressure sensitive means is further subject to the fluid pressure downstream of said bypass valve means.

23. The apparatus of claim 21 in which said fluid flow modulating control means comprises:
(a) control valve means disposed in said fluid flow passageway upstream of said fluid throttling orifice means; and
(b) valve actuating means coupled to said control valve means to modulate the fluid flow applied to said fluid throttling orifice means.

24. The apparatus of claim 23 in which said valve actuating means includes control fluid pressure responsive means subject to modulating control fluid pressure to modulate the fluid flow applied to said fluid throttling orifice means.

25. The apparatus of claim 24 in which said modulating control fluid pressure is a fuction of a condition of the fluid in said space of lower pressure.

26. The apparatus of claim 21 in which said nozzle means comprises a plurality of ejector nozzles.

27. Fluid flow control apparatus providing a flow path for fluid from a pressurized source thereof to a space of lower pressure, comprising:
(a) wall means defining a fluid flow passageway in the flow path and having inlet means arranged to admit pressured fluid thereinto;
(b) nozzle means having fluid inlet means coupled to and communicating with said fluid flow passageway and having fluid outlet means for discharging fluid from said fluid flow passageway to the space of lower pressure;
(c) fluid flow modulating control means, including fluid throttling orifice means, disposed in said fluid flow passageway, downstream of said inlet means thereof, for controlling the fluid flow therethrough;
(d) wall means defining a fluid bypass passageway having an inlet end thereof coupled to and communicating with said fluid flow passageway intermediate said fluid flow modulating control means and said inlet means of said nozzle means, and having an outlet end thereof discharging to the space of lower pressure; and
(e) bypass fluid flow modulating control means including bypass valve means disposed in said fluid bypass passageway to modulate the fluid bypass flow therethrough, and further including actuating means coupled to said fluid bypass valve means, said actuating means having fluid pressure sensitive means subject to the fluid pressure differential across said fluid throttling orifice means for modulating the fluid flow through said fluid bypass passageway, whereby a substantially constant fluid flow to the space of lower pressure is maintained.

28. The apparatus of claim 27 in which said fluid pressure sensitive means is subject further to the fluid pressure differential across said bypass valve means.

29. Fluid flow control apparatus providing a flow path for fluid from a pressurized source thereof to a space of lower pressure, comprising:
(a) wall means defining a fluid flow passageway in the flow path and having inlet means arranged to admit pressurized fluid thereinto;
(b) nozzle means having fluid inlet means coupled to and communicating with said fluid flow passageway, and having fluid outlet means for discharging fluid from said fluid flow passageway to the space of lower pressure;
(c) fluid flow modulating control means, including fluid throttling orifice means, disposed in said fluid flow passageway, downstream of said inlet means thereof, for controlling the fluid flow therethrough;
(d) wall means defining a fluid bypass passageway having an inlet end thereof coupled to and communicating with said fluid flow passageway intermediate said fluid flow modulating control means and said inlet means of said nozzle means, and having an outlet end thereof discharging to the space of lower pressure; and
(e) bypass fluid flow modulating control means including bypass valve means disposed in said fluid bypass passageway to modulate the fluid bypass flow therethrough, and further including actuating means coupled to said fluid bypass valve means, said actuating means having fluid pressure sensitive means subject to the fluid pressure upstream of said fluid throttling orifice means and subject further to the fluid pressure downstream from said bypass valve means for modulating the fluid flow through said fluid bypass passageway, whereby a substantially constant fluid flow to the space of lower pressure is maintained.

30. Fluid flow control apparatus providing a flow path for fluid from a pressurized source thereof to a space of lower pressure, comprising:
(a) wall means defining a fluid flow passageway in the flow path and having inlet means arranged to admit pressurized fluid thereinto;
(b) nozzle means having fluid inlet means coupled to and communicating with said fluid flow passageway, and having fluid outlet means for discharging fluid from said fluid flow passageway to the space of lower pressure;
(c) fluid flow modulating control means, including fluid throttling orifice means, disposed in said fluid flow passageway, downstream of said inlet means thereof, for controlling the fluid flow therethrough;
(d) wall means defining a fluid bypass passageway having an inlet end thereof coupled to and communicating with said fluid flow passageway intermediate said fluid flow modulating control means and said inlet means of said nozzle means, and having an outlet end thereof discharging to the space of lower pressure; and
(e) bypass fluid flow modulating control means including bypass valve means disposed in said fluid bypass passageway to modulate the fluid bypass flow therethrough, and further including actuating means coupled to said fluid bypass valve means, said actuating means having fluid pressure sensitive means subject to fluid pressure in said fluid flow passageway for modulating the fluid flow through said fluid bypass passageway, whereby a substantially constant fluid flow to the space of lower pressure is maintained, said fluid pressure sensitive means comprising first and second fluid pressure sensitive elements coupled together to act jointly on said fluid bypass valve means, one face of each of said elements being subject to said fluid pressure in said fluid flow passageway intermediate said fluid throttling orifice means and said bypass valve means, the other face of one of said elements being subject to the fluid pressure upstream from said fluid throttling orifice means, the other face of the other of said elements being subject to the fluid pressure downstream from said bypass valve means.

31. Fluid flow control apparatus providing a flow path for fluid from a pressurized source thereof to a space of lower pressure, comprising:
   (a) wall means defining a fluid flow passageway in the flow path;
   (b) fluid flow modulating control means, including fluid throttling orifice means, disposed in said fluid flow passageway for controlling the fluid flow therethrough from said pressurized source;
   (c) nozzle means disposed in said fluid flow passageway and having fluid inlet means coupled to and communicating with said fluid flow passageway downstream from said fluid flow modulating control means, and having fluid outlet means for discharging fluid from said fluid flow passageway to the space of lower pressure;
   (d) wall means defining a fluid bypass passageway having an inlet end thereof coupled to said fluid flow passageway intermediate said fluid flow modulating control means and said nozzle means, and having an outlet end thereof discharging to the space of lower pressure; and
   (e) bypass fluid flow modulating control means including bypass valve means disposed in said fluid bypass passageway to modulate the fluid bypass flow therethrough, and further including actuating means coupled to said bypass valve means, said actuating means having pressure sensitive means subject to fluid pressure in said fluid flow passageway intermediate said fluid flow modulating control means and said fluid bypass passageway, said fluid pressure sensitive means comprising first and second fluid pressure sensitive elements coupled together to act jointly on said fluid bypass valve means, one face of each of said elements being subject to said fluid pressure in said passageway intermediate said fluid flow modulating means and said bypass valve means, the other face of one of said elements being subject to the fluid pressure upstream of said fluid throttling orifice means, the other face of the other of said elements being subject to the fluid pressure downstream from said fluid bypass valve means.

32. Fluid flow control apparatus providing a flow path for fluid from a pressurized source thereof to a space of lower pressure, comprising:
   (a) wall means defining a fluid flow passageway in the flow path and having means arranged to admit pressurized fluid thereinto;
   (b) fluid throttling orifice means disposed in said fluid flow passageway for controlling the fluid flow therethrough;
   (c) nozzle means disposed in said fluid flow passageway downstream from said fluid throttling orifice means and having fluid inlet means coupled to and communicating with said fluid flow passageway and having fluid outlet means for discharging fluid from said fluid flow passageway to the space of lower pressure;
   (d) wall means defining a fluid flow bypass passageway having an inlet end thereof coupled to and communicating with said fluid flow passageway and having an outlet end thereof discharging to the space of lower pressure; and
   (e) bypass fluid flow modulating control means including bypass valve means disposed in said fluid bypass passageway, and further including actuating means coupled to said bypass valve means, said actuating means having fluid pressure sensitive means subject to the fluid pressure upstream of said fluid throttling orifice means and subject further to the fluid pressure downstream from said bypass valve means for modulating the fluid flow through said fluid bypass passageway, whereby a substantially constant fluid flow to the space of lower pressure is maintained.

33. Fluid flow control apparatus providing a flow path for fluid from a pressurized source thereof to a space of lower pressure, comprising:
   (a) wall means defining a fluid flow passageway in the flow path and having means arranged to admit pressurized fluid thereinto;
   (b) fluid throttling orifice means disposed in said fluid flow passageway for controlling the fluid flow therethrough;
   (c) nozzle means disposed in said fluid flow passageway downstream from said fluid throttling orifice means and having fluid inlet means coupled to and communicating with said fluid flow passageway and having fluid outlet means for discharging fluid from said fluid flow passageway to the space of lower pressure;
   (d) wall means defining a fluid flow bypass passageway having an inlet end thereof coupled to and communicating with said fluid flow passageway and having an outlet end thereof discharging to the space of lower pressure; and
   (e) bypass fluid flow modulating control means including bypass valve means disposed in said fluid bypass passageway, and further including actuating means coupled to said bypass valve means, said actuating means having fluid pressure sensitive means subject to fluid pressure in said fluid flow passageway for modulating the fluid flow through said fluid bypass passageway, whereby a substantially constant fluid flow to the space of lower pressure is maintained, said fluid pressure sensitive means comprising first and second fluid pressure sensitive elements coupled together to act jointly on said fluid bypass valve means, one face of each of said elements being subject to said fluid pressure in said fluid flow passageway intermediate said fluid throttling orifice means and said bypass valve means, the other face of one of said elements being subject to the fluid pressure upstream from said fluid throttling orifice means, the other face of the other of said elements being subject to the fluid pressure downstream from said bupass valve means.

* * * * *